United States Patent [19]
Espelage

[11] 3,982,167
[45] Sept. 21, 1976

[54] CURRENT CONTROL SYSTEM FOR HIGH FREQUENCY LINK CYCLOCONVERTER

[75] Inventor: Paul M. Espelage, Ballston Lake, N.Y.

[73] Assignee: General Electric Company, Schenectady, N.Y.

[22] Filed: July 31, 1975

[21] Appl. No.: 600,879

[52] U.S. Cl. .................................... 321/61; 321/7
[51] Int. Cl.² ........................................ H02M 5/27
[58] Field of Search .................. 321/6, 7, 60, 69 R, 321/61

[56] References Cited
UNITED STATES PATENTS

| | | | |
|---|---|---|---|
| 3,487,289 | 12/1969 | McMurray | 321/69 R X |
| 3,517,300 | 6/1970 | McMurray | 321/69 R X |
| 3,564,390 | 2/1971 | Stratton | 321/69 R |
| 3,678,367 | 7/1972 | McMurray | 321/69 X |

*Primary Examiner*—William M. Shoop
*Attorney, Agent, or Firm*—Donald R. Campbell; Joseph T. Cohen; Jerome C. Squillaro

[57] ABSTRACT

In a system including an input cycloconverter which operates a high frequency resonant tank from a source of low frequency voltage supplied through a reactor, with or without an output cycloconverter, an input cycloconverter control circuit and method independently controls real and reactive power or real power and input power factor. The in-phase and quadrature components of input line current as well as the tank voltage are controlled, and for the main applications a simpler implementation has a limited range of phase angle settings close to 0° and to ±90°. The current control technique has the advantages of fast response and simplicity.

14 Claims, 7 Drawing Figures

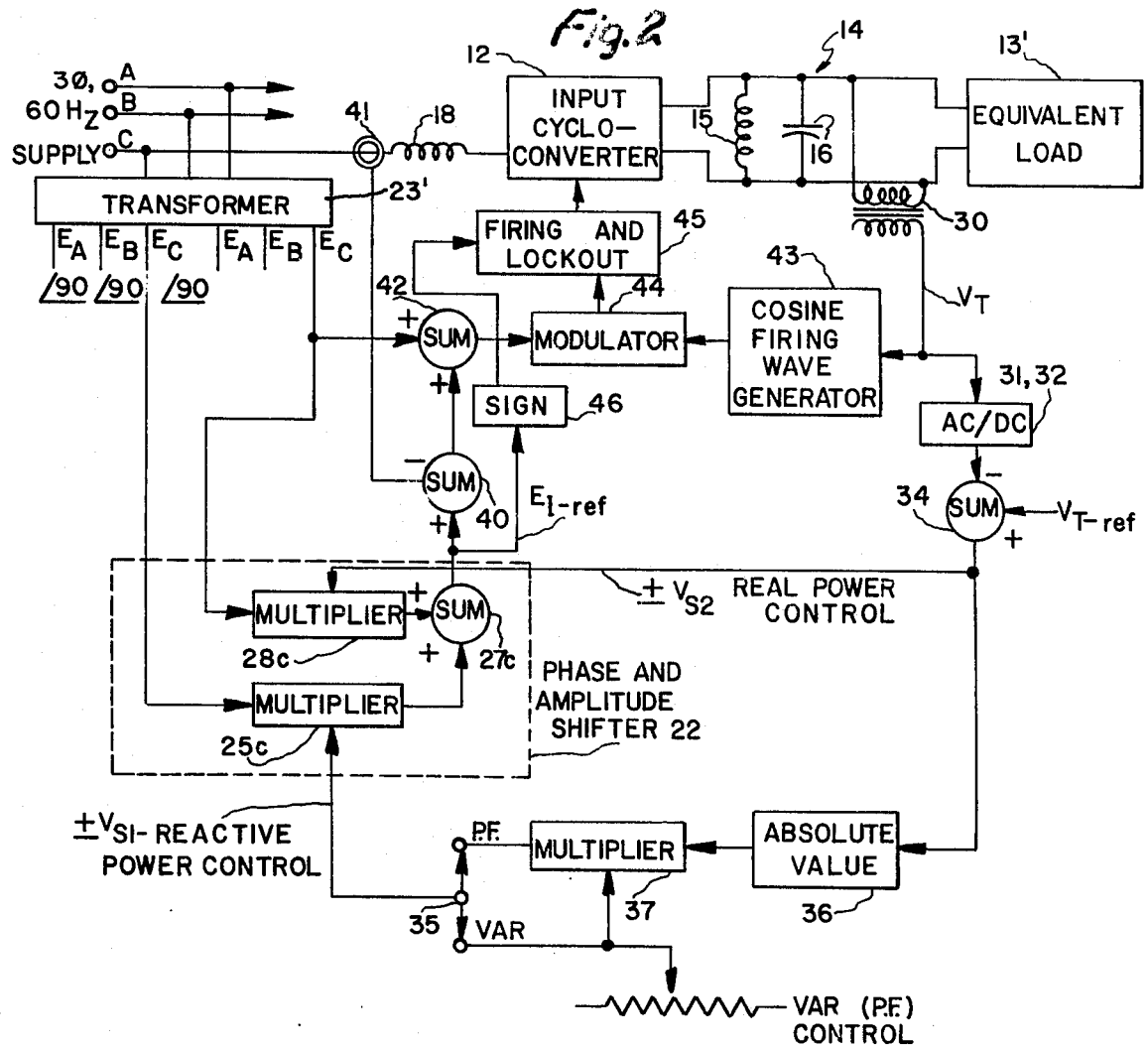

CURRENT CONTROL SYSTEM FOR HIGH FREQUENCY LINK CYCLOCONVERTER

BACKGROUND OF THE INVENTION

This invention relates to controlling a high frequency link cycloconverter system, and more particularly to a current controller and method for operating a cycloconverter to control real and reactive power flow to and from a high frequency resonant tank circuit.

The high frequency link cycloconverter system originally disclosed in U.S. Pat. No. 3,742,336 to B. D. Bedford and also in U.S. Pat. No. 3,882,369 to W. McMurray, both assigned to the same assignee as this invention, is essentially comprised of two cascaded cycloconverters separated by a high frequency parallel resonant tank circuit which provides variable commutation energy for both cycloconverters. Normally, the input cycloconverter operates in the inverting mode and the output cycloconverter in the rectifying mode, although during regeneration their roles are reversed. For static VAR control applications, the output cycloconverter is not required.

The input cycloconverter is supplied with 60 Hz or other low frequency polyphase voltage through a series reactor in each phase and converts the a-c polyphase voltage directly to the high frequency tank. The input cycloconverter can be considered analogous to a synchronous machine operating on infinite bus and capable of controlling real and reactive power independently or real power and input power factor independently. One control strategy for accomplishing this for both directions of power flow is based on controlling the in-phase and quadrature components of induced cycloconverter voltage, which is the phasor summation of the line voltage and the voltage across the input reactor in each phase. This is further explained in copending application Ser. No. 573,373, filed on Apr. 30, 1975 by Bimal K. Bose and the inventor, now U.S. Pat. No. 3,959,720, entitled "Voltage Control System for High Frequency Link Cycloconverter," and the application of the voltage control system to a static VAR controller is disclosed in the concurrently filed application Ser. No. 573,372, by the inventor, now U.S. Pat. No. 3,959,719, entitled "Static Controller for Power Factor Correction and Adaptive Filtering," both assigned to the assignee of this invention.

In any control strategy it is necessary to regulate the tank voltage to be relatively constant in view of the fact that the high frequency tank is a small reservoir of energy compared to the power rating of the whole circuit. Although satisfactory for many applications, a possible deficiency of the voltage control system is that the time constant for the series reactors in the 60 Hz lines restricts the bandwidth of the high frequency tank voltage regulator. High static and transient loading on the system can cause the tank voltage to modulate at tank frequency plus or minus even multiples of the load and source frequency. These modulation frequencies are beyond the bandwidth of the tank voltage regulator. Since this modulation can deteriorate the input cycloconverter commutation capability, compensation can increase power circuit costs to maintain a given minimum tank voltage.

SUMMARY OF THE INVENTION

In accordance with the invention, the in-phase and quadrature components of input line current are controlled independently by the input cycloconverter control circuit while maintaining the tank voltage within predetermined limits, to thereby achieve a high frequency link cycloconverter system with a fast response and reduced tank voltage modulation. This control technique has inherent four-quadrant capability and enables independent control of the 60 Hz (or other low supply frequency) real and reactive power, or real power and input power factor. Thus, the input cycloconverter control circuit is comprised by a tank voltage feedback circuit for deriving a tank voltage error signal, a phase and amplitude shifter for generating per phase cycloconverter reference signals for controlling the real power and in-phase input current component in dependence upon the polarity and magnitude of the tank voltage error signal and for independently controlling the reactive power and quadrature input current component in dependence upon the polarity and magnitude of a reactive power or VAR control signal, and firing and control means in effect actuated by the per phase cycloconverter reference signals.

Although a general input line current control system is possible, a simpler implementation is realized which is suitable for the two main applications of these power conditioners, namely a high frequency link cycloconverter system with both input and output cycloconverters and a phase angle setting close to 0°, and a static VAR controller with only an input cycloconverter and tank and a phase angle setting close to ±90°. A phase and amplitude shifter with transformer windings, multipliers used as variable gain amplifiers, and summing amplifiers and a nearly instantaneous response is preferably employed, although in a somewhat different manner than in the voltage control system. In a static VAR controller the reactive power is commanded directly, while to control power factor over a limited range near 0°, the addition is made that the external reactive power and desired input power factor control signal is multiplied by the tank voltage error signal to derive a power factor control signal which in turn is used as the reactive power control signal.

BRIEF DESCRIPTION OF THE DRAWINGS

FIG. 2 is a simplified block diagram of the converter system and input cycloconverter control circuit wherein the equivalent load is either the output cycloconverter or the circuit losses in a static VAR controller, showing only a single phase of the control circuit in greater detail than in FIG. 1;

FIG. 3 illustrates diagrammatically a cycloconverter analogy to a synchronous machine;

DESCRIPTION OF THE PREFERRED EMBODIMENTS

Figure 1:
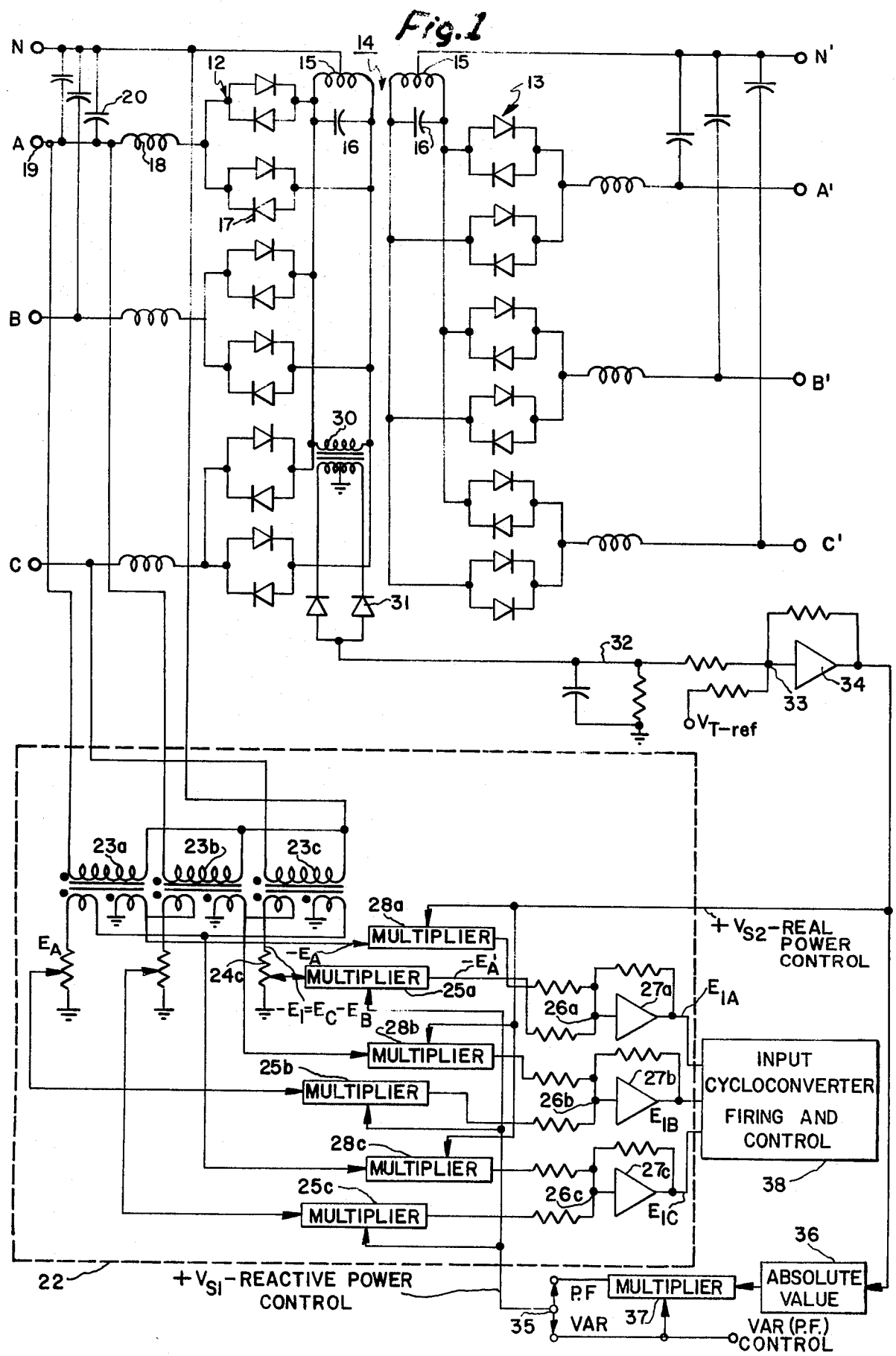
FIG. 1 is a schematic circuit diagram partially in block diagram form of a high frequency link cycloconverter system with wye-connected input and output cycloconverters and an input cycloconverter control circuit for obtaining input line currents within limited ranges near 0° and 90° with respect to the line voltage.

The cascaded high frequency link cycloconverter system can be constructed in either Δ-connected or wye-connected versions as is illustrated in FIGS. 14 and 15 of the previously mentioned U.S. Pat. No. 3,882,369, to which the reader may refer for further information. The wye-connected cycloconverter system here shown in FIG. 1 in its preferred form includes twelve-thyristor input and output cycloconverters 12 and 13, each comprising three single phase-to-single phase cycloconverters separated by a high frequency tank 14 or parallel resonant L-C commutation circuit operated at an adjustable frequency above its resonant frequency. The tuned high frequency tank circuit 14 more particularly utilizes a single combined reactor-coupling transformer 15 having center-tapped primary and secondary windings across each of which is coupled a commutating capacitor 16. In input cycloconverter 12, one pair of inverse-parallel thyristors 17 in each phase is effectively connected to one junction of the high frequency resonant tank 14 while the other pair of thyristors is effectively connected to the other junction, and both pairs are connected through a series reactor 18 to one of the input terminals 19. The input filter also includes three filter capacitors 20 provided between the respective input terminals 19 and the neutral terminal N. The output side cycloconverter and filter are identical to the input side but connected in mirror image fashion. In a typical application of this cycloconverter system as a variable speed ac motor drive, the source is a three phase, 60 Hz, 230 volts supply, the high frequency tank is operated at about 2–4 kHz, and the adjustable voltage, three phase output at the load has a variable frequency between 0–300 Hz.

When supplying power to the load, the input regenerating cycloconverter 12 operates the tuned high frequency tank 14 directly from the polyphase ac supply at a frequency above its resonant frequency, the amount of available commutating energy being determined by the tank frequency. In the case of power flow in a direction from the load to the source, the input cycloconverter 12 is controlled in conventional fashion and operates in a rectifying mode to return power to the supply. Since the input cycloconverter 12 and output cycloconverter 13 operate independently and the output cycloconverter operates in a conventional manner, the current control system herein described is for the input unit only.

This control scheme independently controls the in-phase and quadrature components of input line current in each phase to thereby achieve independent control of the real and reactive power or real power and input power factor, while maintaining the high frequency tank voltage constant or within predetermined limits. High frequency tank 14 is a relatively small reservoir of energy and the tank voltage tends to vary over wide limits when the load on the output cycloconverter fluctuates. Too high a tank voltage can damage or exceed the ratings of the components, while too low a tank voltage can result in excessive input currents for much the same reason as when the back emf of a synchronous machine is a low. Thus, the input cycloconverter control circuit shown at the bottom of FIG. 1 generates properly phase and amplitude shifted cycloconverter reference voltages for determining the sign and amplitude of the input current components while maintaining the tank voltage within prescribed limits for both directions of power flow. As is evident in FIG. 2 to those skilled in the art, the per phase cycloconverter reference signals $E_{I-ref}$ to satisfy the current control scheme and method of operation are employed in conventional fashion in the input cycloconverter firing and control circuit, using the cosine firing wave phase control technique, to generate appropriately timed firing pulses for the thyristor switches. FIG. 2 illustrates diagrammatically the second principal application for high frequency link cycloconverter systems, namely as a static reactive power or VAR controller. For use as a static VAR controller, the output cycloconverter is not used and the equivalent load 13' is a simple resistive load representing the losses in the system. In this case, the input cycloconverter control circuit is operated to produce real power flow only approximately sufficient to supply the inherent circuit losses while selectively producing a commanded variable amount of leading (or lagging) reactive power. For further information and for explanation of typical applications as an electronically variable capacitance for use in power factor correction, adaptive filtering, and 60 Hz VAR control, reference may be made to the previously mentioned U.S. Pat. No. 3,959,719. As is evident, in the current control system, the approximately 90° displaced leading or lagging input line current is commanded directly by the input cycloconverter control circuit.

Figure 4:
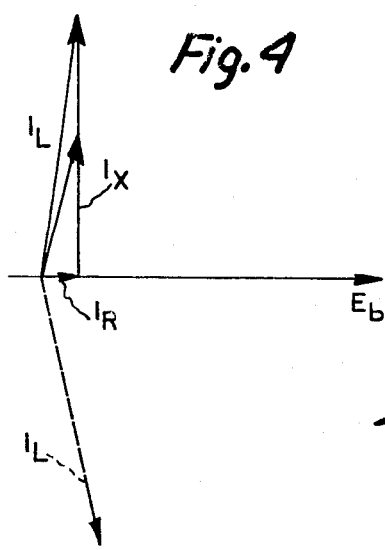
FIG. 4 is a phasor diagram for the converter system used as a static VAR controller with phase angle setting close to ±90°.
Figure 5:
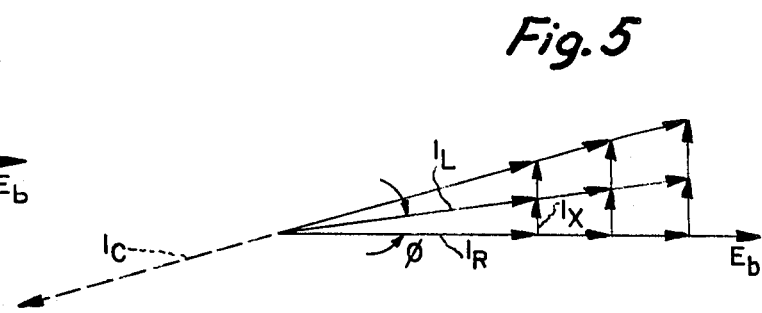
FIG. 5 is a phasor diagram for a high frequency link cycloconverter system with phase angle setting close to 0°.

Before proceeding further, the synchronous machine analogy and background for understanding the construction and operation of the phase and amplitude shifter, an essential component of the input cycloconverter control circuit, will be explained with regard to FIGS. 3–5. In the diagram shown in FIG. 3 of a cycloconverter analogy to a synchronous machine operating on infinite bus or from a "stiff" source, 60 Hz power is supplied through reactor $X_s$ (i.e., filter inductor 18) to the cycloconverter. For simplicity the impedance $X_s$ is assumed to be purely reactive, and $E_b$ is designated as the per phase input line voltage used as a reference. Following the synchronous machine analogy, $I_c$ is the current flow in the direction from the cycloconverter to source, and $I_L = -I_c$ is the current flowing from the source to the cycloconverter. The equation indicating that the input line current has in-phase and quadrature components is shown in FIG. 3, but it will be understood that the same is true of the cycloconverter current. In the current control system, the direction of power flow and amplitude of power flow are respectively determined by the sign and amplitude of the in-phase component of current, while the sign of reactive power and amplitude of reactive power are respectively determined by the sign and amplitude of the quadrature component of current.

The current control system is the dual of the voltage control system described in the previously mentioned U.S. Pat. No. 3,959,720 in which the sign and amplitude of the in-phase and quadrature components of cycloconverter voltage are controlled. This application as well as copending allowed application Ser. No. 562,338, filed Mar. 26, 1975 by B. K. Bose and the inventor, entitled "Phase Shifter for Controlling the Power Components and Power Factor of a Cycloconverter," assigned to the assignee of this invention, both describe a wide range, nearly instantaneously operating, amplitude and phase shifter for generating cycloconverter reference voltages which uses multipliers as variable gain amplifiers and operational summing amplifiers. In the current control system, an amplitude and phase shifter designed according to these principles is quite complex when a full range of real power control and reactive power control or input power factor control is desired. While the real power control can be readily implemented using the tank voltage error signal to determine the magnitude and polarity of real power, reactive power and input power factor control over a full range is more difficult to obtain. One control technique suitable for all applications would be to let the tank voltage error signal balance real power demand by controlling the magnitude of the in-phase line current while a predetermined power factor is maintained by regulation of the quadrature component of line current according to $I < 90 = I < 0^* \tan \theta$. For small angle $\theta$, a linear relationship $I < 90 = I < 0^* \theta$ results.

Instead of trying to achieve a general method of current control, the simpler implementation shown in FIGS. 1 and 2 results when it is assumed that the two main applications of these power conditioners are (1) a high frequency link cycloconverter system with input and output cycloconverters and a phase angle setting close to 0°, and (2) a static VAR controller with only an input cycloconverter and tank and phase angle setting close to ±90°. This more restrictive control range for the current control system allows a control implementation similar in concept to the previously described voltage control system. The phasor diagram for such a high frequency link static VAR controller is most easily understood and is shown in FIG. 4. Using the per phase line voltage $E_b$ as a reference, the in-phase component of input line current $I_R$ has a relatively small value since only sufficient real power is supplied to compensate the inherent circuit losses, while the quadrature component of input line current $I_x$ is relatively large and has a selected variable magnitude and sign depending upon the amount of leading or lagging reactive power desired. The input line current $I_L$ is then close to ±90°. In FIG. 5 is shown the phasor diagram for a high frequency link system with an output cycloconverter and a phase angle setting close to 0°, such as is suitable for a variable speed ac induction motor drive. This phasor diagram is applicable to the implementation illustrated at the bottom of FIGS. 1 and 2, to be explained in detail later, wherein an externally generated VAR control signal can be used directly to set the reactive power, or wherein a desired power factor can be set by multiplying this external control signal by the tank voltage error signal to thereby control the reactive power. Thus, for a particular in-phase current component $I_R$ to supply the required real power, the current quadrature component $I_x$ is varied by means of the external control signal to set the power factor angle $\phi$. On the other hand, at a particular setting of power factor angle $\phi$, the phase angle $\phi$ is maintained constant as the magnitude of $I_R$ varies by proportionately changing the magnitude of the quadrature component $I_x$, three cases being illustrated. This control technique is also suitable for reverse power flow.

Figure 6:
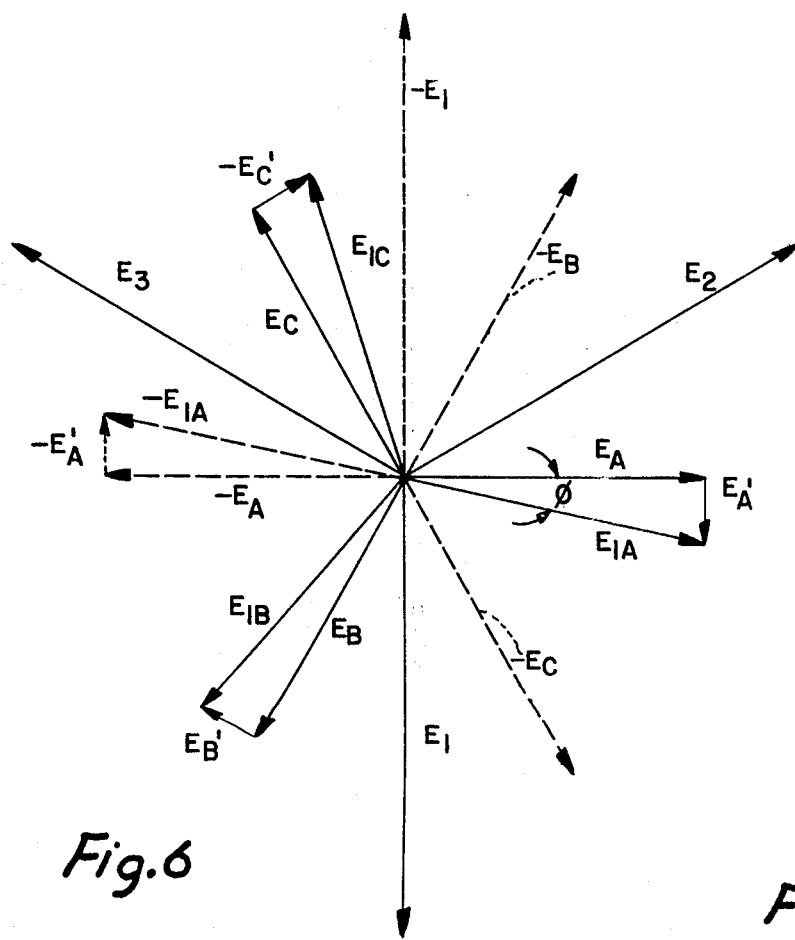
FIG. 6 is a phasor diagram useful in explaining operation of the phase and amplitude shifter with a balanced three phase supply as shown in FIGS. 1 and 2 to derive cycloconverter reference signals for obtaining input line currents near 0° with respect to line voltage.

Referring now to FIG. 1, a simple phase and amplitude shifter 22 is shown for generating single phase cycloconverter reference voltage signals for determining the in-phase and quadrature components of input line current which can control the real power and input power factor or reactive power of the cycloconverter independently and linearly by dc signal voltages. The phase shifter circuit is insensitive to bus or line voltage frequency drift, is distortion free, and has an almost instantaneous response characteristic. In addition, the real power and power factor angle can be changed to either polarity by simply reversing the polarity of the dc control signals. Phase and amplitude shifter 22 uses transformer windings to obtain in-phase and quadrature line voltage reference signals used functionally as in-phase and quadrature line current references, and is suitable for a three phase power supply that is balanced in amplitude and phase. General case phase shifters for unbalanced systems are disclosed in the aforementioned copending applications, to which the reader is referred for a more thorough understanding of the present phase and amplitude shifter. FIG. 6 gives the phasor diagram used to explain the basis of operation of the special case phase shifter for a balanced supply. To obtain a frequency insensitive cosine wave for each phase used as a quadrature input line current reference, as well as each single phase sine wave line voltage used as an in-phase input line current reference, three step-down transformers, 23a, 23b, and 23c have their primary windings respectively connected between each input line and neutral. Each single phase transformer has a split secondary winding such that one gives a positive polarity phase voltage while the other gives the negative polarity phase voltage, e.g., $E_C$ and $-E_C$. The circuit for producing the phase A cycloconverter reference signal $E_{IA}$ will be explained by way of illustration, the other two phases being similar so that corresponding components in the three phases are indicated by corresponding numerals. To obtain the frequency insensitive 90° shifted cosine wave (in FIG. 6, see phasor $-E_1$ which is perpendicular to the reference line voltage phasor $E_A$), the appropriate secondary windings of transformers 23b and 23c are connected to obtain a voltage signal representing $E_C-E_B$ which by phasor addition gives $-E_1$. To this end, as is illustrated, the dot end of the appropriate secondary winding of transformer 23b is grounded while the outer end is connected to the undotted end of the appropriate secondary winding in transformer 23c. The dot or positive polarity end of this latter secondary winding is coupled directly to a potentiometer 24c for deriving at the wiper a proportional voltage to be supplied as one input to analog four-quadrant multiplier 25a. The positive or negative polarity reactive power control signal $v_{s1}$ in accordance with the invention is the second input to multiplier 25a so as to generate at the output of the multiplier a cosine wave with a modulated amplitude representing the signal $-E_{A'}$. This cosine wave with a polarity and peak amplitude depending upon the polarity and magnitude of the reactive power control signal is fed through an input resistor to the summing junction 26a of an operational amplifier 27a connected as a summing amplifier. To obtain real power control, the sine wave line voltage $-E_A$ is an input to a second four-quadrant multiplier 28a used as a variable gain amplifier, the other input to multiplier 28a being the real power control signal $v_{s2}$. In the current control system, the tank voltage error signal is used as the real power control signal $v_{s2}$. The variable amplitude and polarity sine wave at the output of multiplier 28a is the other input to summing junction 26a. Due to the inverting characteristic of summing amplifier 27a, the cycloconverter reference signal generated at its output is the desired positive polarity signal $E_{IA}$. The respectively 120° displaced cycloconverter reference signals $E_{IB}$ and $E_{IC}$ are obtained at the outputs of the other channels. Briefly reviewing, it is seen that transformer windings are used to obtain in-phase and quadrature line current reference signals. Each of these reference signals is applied to one input of a separate multiplier per 60 Hz phase. The magnitude and sign of each current component is then controlled by a dc signal applied to the other multiplier input (also see FIG. 2).

A tank voltage feedback circuit is used for generating the tank voltage error signal indicative of the difference between a sensed instantaneous tank voltage and a reference tank voltage. A suitable voltage sensor is used to sense the high frequency tank voltage, such as the potential transformer 30 shown in FIG. 1 coupled across the input circuit tank components and having a grounded center tap secondary winding the opposite ends of which are connected to alternately conductive diodes 31 to produce a full wave rectified ac voltage. A corresponding dc voltage or sensor signal is generated as by using a resistor-capacitor peak detector 32, and is fed through an input resistor to the summing junction 33 of an operational amplifier 34 connected as a summing amplifier. The other input to the summing junction 33 is a preselected dc reference tank voltage $V_{T\text{-}ref}$. The tank voltage error signal generated at the output of operational amplifier 34 is used directly as the real power control signal $v_{s2}$ and is either positive or negative depending upon the magnitude of the sensed actual tank voltage as compared to the reference tank voltage. Thus, the direction of power flow through input cycloconverter 12 changes depending upon the polarity of the tank voltage error signal, although usually power flow is in the direction from the source to the cycloconverter.

The reactive power can be commanded directly by using an external reactive power or VAR control signal as the reactive power control signal $v_{s1}$. Two-position switch 35 is assumed to be in the proper position. Then the polarity and sign of the external control signal controls the cycloconverter reactive power and the quadrature input line current component. For complete high frequency link cycloconverter systems with an output cycloconverter where the input power factor is to be controlled for nominal phase angle settings close to 0°, the additional components shown at the bottom of FIG. 1 are needed. In particular, the tank voltage error signal is applied to an absolute valve circuit 36 and the absolute value of the error signal is an input to an additional two-quadrant multiplier 37. The external control signal representative of the desired reactive power and input power factor is now used as the other input to multiplier 37, and the resulting power factor control signal (switch 35 is assumed to be in the proper position) is used as the reactive power control signal $v_{s1}$. Thus, as the value of the tank voltage error signal and the magnitude of the power changes, a proportionate amount of reactive power is commanded depending upon the magnitude and polarity of the external VAR or desired PF control signal. The phasor diagram of FIG. 5 is applicable. The tank voltage error signal is proportional to power and the previously constant VAR command is now programmed to provide $$\text{VAR} = W \cdot \tan \phi = W \cdot k,$$

where $\phi$ is constant for a given power factor setting. Obviously, a nonlinear relationship exists between the dc power factor command voltage and power factor, and the allowable power factor deviation from unity is restricted. Within a limited range, the input power factor (either leading or lagging) is adjustable by varying the magnitude of the external control signal. As was mentioned, the input cycloconverter firing and control circuitry 38 actuated by the generated per phase cycloconverter reference signals is of conventional design and is illustrated in somewhat more detail in FIG. 2.

Figure 7:
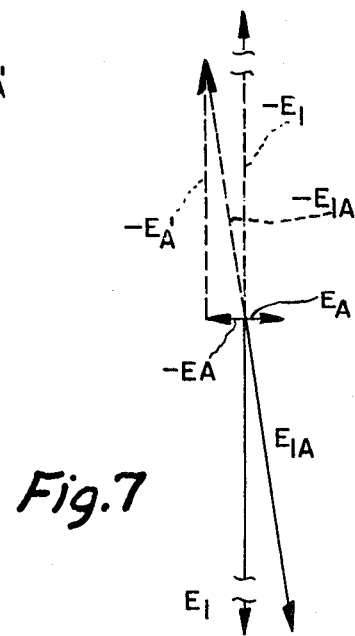
FIG. 7 is a partial phasor diagram similar to FIG. 6 for one phase only for deriving cycloconverter reference signals to obtain input line currents near ±90° with respect to line voltage.

In FIG. 2 directed to a static VAR controller, the input filter is shown schematically and partially omitted, high frequency resonant tank 14 is shown in its simplest form, and the static controller losses are illustrated as an equivalent load. Only a single phase of phase and amplitude shifter 22 is illustrated schematically, as is the three phase transformer 23' for generating the sine wave in-phase line current reference signals and the cosine wave quadrature line current reference signals. The main components of the tank voltage control loop for generating the tank voltage error signal and real power control signal are designated by the same numerals. For use as a static VAR controller, components 36 and 37 are not needed and the magnitude and polarity of the external VAR control signal controls the reactive power and determines the quadrature input line current component. The FIG. 4 phasor diagram is applicable, with nominal phase angle settings close to ±90°. FIG. 7 is a partial phasor diagram similar to FIG. 6 for one phase only depicting operation of the phase and amplitude shifter in the static VAR controller. As compared to FIG. 6, the magnitudes of the phasors —$E_A$ and —$E_{A'}$ controlling real and reactive power are reversed. To further explain the cycloconverter firing and control circuitry, the appropriately phase and amplitude shifted cycloconverter reference signal $E_{I\text{-}ref}$ is compared to a per phase sensed instantaneous input line current signal using a summer 40 to derive a reference signal error voltage. A suitable current sensor 41 is used to continuously sense the instantaneous input line current. The reference signal error voltage, rather than being used directly to drive the cycloconverter firing circuits, is augmented by a voltage command signal. Thus, at zero error voltage representing the commanded zero current, this voltage command calls for a cycloconverter back emf equal to the input line voltage, thereby providing a stable zero line current balance point. To this end, a second summer 42 is provided for summing the reference signal error voltage with the appropriate per phase sine wave line voltage signal to derive a line voltage error voltage. Accordingly, the output of summer 42 actuates the cycloconverter firing circuits.

In order to use the cosine firing wave phase control method of control, the instantaneous tank voltage signal $V_T$ derived from potential transformer 30 or a similar transformer is fed to a frequency insensitive cosine firing wave generator 43 preferably of the type described in copending allowed application Ser. No. 561,592, filed on Mar. 24, 1975, by B. K. Bose and the inventor, assigned to the same assignee as this invention. In modulator 44, as is known in the art, the successive intersections of the line voltage error voltage with the high frequency cosine firing waves are continuously determined to time the generation of SCR firing pulses by firing and lockout circuitry 45. Depending upon the commanded direction of power flow through the cycloconverter, one SCR in each inverse-parallel pair is locked out according to the sign of the reference signal $E_{l\text{-}ref}$ as provided by circuit 46. For further information on thyristor firing control using the cosine firing wave technique, the reader is referred to the book "The Theory and Design of Cycloconverters" by William McMurray, The MIT Press, Cambridge, MA, copyright 1972, Library of Congress Catalog Card No. 70-178121.

The particular advantage of the current control system is that it has a fast response inasmuch as the bandwidth of the tank voltage regulator loop is increased, thereby attenuating the tank voltage modulation and increasing load transient response as well as the overall system response. This results in increased range of application and reduced power circuit cost. In addition, the current command system simplifies the circulating current-free cycloconverter internal controls, since the current-command signal $E_{l\text{-}ref}$ can be used directly to determine which polarity bank of thyristors to render conductive. Although a simplified, restricted range current control system with a simplified phase and amplitude shifter suitable for a balanced three phase system has been shown in FIGS. 1 and 2, it is appreciated that the same simplified version can be used with unbalanced systems when appropriate compensation is provided.

While the invention has been particularly shown and described with reference to preferred embodiments thereof, it will be understood by those skilled in the art that the foregoing and other changes in form and details may be made therein without departing from the spirit and scope of the invention.

The invention claimed is:

1. A cycloconverter system comprising
   a polyphase cycloconverter circuit in cascade with a high frequency resonant tank circuit and having in each phase a series filter inductor connectable to a source of low frequency line voltage,
   a cycloconverter control circuit for controlling the in-phase and quadrature components of input line current in each phase and for maintaining the tank voltage within predetermined limits,
   said control circuit including a tank voltage feedback circuit for sensing the tank voltage and comparing to a reference voltage to derive a tank voltage error signal, phase and amplitude shifter means for generating per phase cycloconverter reference signals for controlling the real power and in-phase input current component in dependence upon the polarity and magnitude of said tank voltage error signal and for independently controlling the reactive power and quadrature input current component in dependence upon the polarity and magnitude of a reactive power control signal, and firing and control means in effect actuated by said cycloconverter reference signals for controlling said cycloconverter.

2. A cycloconverter system according to claim 1 further including means for multiplying said tank voltage error signal by an external control signal representative of desired reactive power and input power factor to derive a power factor control signal used as the reactive power control signal.

3. A cycloconverter system according to claim 1 further including means for multiplying said tank voltage error signal by an external control signal representative of desired reactive power to derive a power factor control signal, and switch means for selectively using said external control signal and said power factor control signal as the reactive power control signal.

4. A cycloconverter system according to claim 1 wherein said phase and amplitude shifter means is comprised in each phase by means for converting at least two input sine wave signals representative of the per phase line voltages to a cosine wave signal of proportional amplitude, first multiplier means for varying the amplitude and polarity of said cosine wave signal in dependence upon the magnitude and polarity of said reactive power control signal to thereby generate a variable amplitude cosine wave signal, second multiplier means for varying the amplitude and polarity of another per phase sine wave line voltage signal in dependence upon the magnitude and polarity of said tank voltage error signal to thereby generate a variable amplitude sine wave signal, and summing means for summing said variable amplitude sine wave and cosine wave signals to generate said per phase cycloconverter reference signal.

5. A cycloconverter system according to claim 4 further including in each phase means for summing said cycloconverter reference signal with a sensed instantaneous input line current signal to derive a reference signal error voltage, and means for summing said reference signal error voltage with said other per phase sine wave line voltage signal to derive a line voltage error voltage, said firing and control means being actuated in each phase by said line voltage error voltage.

6. A high frequency link cycloconverter system comprising
   cascaded input and output cycloconverter circuits linked by a high frequency resonant tank circuit, said input cycloconverter having in each phase a series filter inductor connectable to a source of low frequency line voltage,
   an input cycloconverter control circuit for controlling the in-phase and quadrature components of input line current in each phase and for maintaining the tank voltage within predetermined limits for both directions of power flow,
   said control circuit including a tank voltage feedback circuit for sensing the instantaneous tank voltage and comparing the sensed value to a reference voltage to derive a tank voltage error signal, phase and amplitude shifter means for generating per phase cycloconverter reference signals for controlling the real power and in-phase input current component in dependence upon the polarity and magnitude of said tank voltage error signal and for independently controlling the reactive power and quadrature input current component in dependence upon the polarity and magnitude of a reactive power control signal, and firing and controlling means in effect actuated by said per phase cycloconverter reference signals for controlling said cycloconverter.

7. A cycloconverter system according to claim 6 further including means for multiplying said tank voltage error signal by an external control signal representative of desired reactive power and input power factor to derive a power factor control signal used as the reactive power control signal.

8. A cycloconverter system according to claim 7 wherein said phase and amplitude shifter means is comprised in each phase by means for converting at least two input sine wave signals representative of the per phase line voltages to a cosine wave signal of proportional amplitude, first multiplier means for varying the amplitude and polarity of said cosine wave signal in dependence upon the magnitude and polarity of said reactive power control signal to thereby generate a variable amplitude cosine wave signal, second multiplier means for varying the amplitude and polarity of another per phase sine wave line voltage signal in dependence upon the magnitude and polarity of said tank voltage error signal to thereby generate a variable amplitude sine wave signal, and summing means for summing said variable amplitude sine wave and cosine wave signals to generate said per phase cycloconverter reference signal.

9. A cycloconverter system according to claim 8 further including in each phase means for summing said cycloconverter reference signal with a sensed instantaneous input line current signal to derive a reference signal error voltage, and means for summing said reference signal error voltage with said other per phase sine wave line voltage signal to derive a line voltage error voltage, said firing and control means being actuated in each phase by said line voltage error voltage.

10. The method of controlling a cycloconverter system including a polyphase cycloconverter in cascade with a high frequency resonant tank circuit and having in each phase an input series filter inductor connectable to a source of low frequency line voltage and conducting input line current, said method comprising the steps of continuously sensing the instantaneous tank voltage and deriving a sensor signal indicative thereof, comparing said tank voltage sensor signal to a reference voltage and deriving a tank voltage error signal, generating per phase cycloconverter reference signals that are phase and amplitude shifted with respect to the per phase line voltage for controlling the real power and in-phase component of input current in dependence upon the polarity and magnitude of said tank voltage error signal and for further independently controlling the reactive power and quadrature component of input current in dependence upon the polarity and magnitude of a reactive power control signal, and controlling said cycloconverter in dependence upon said cycloconverter reference signals to produce per phase input currents having desired in-phase and quadrature components while maintaining the tank voltage within predetermined limits.

11. The method according to claim 10 wherein the controlling step further includes sensing the instantaneous per phase input line current and summing a signal representative thereof with the respective per phase cycloconverter reference signal to derive a reference signal error voltage, summing a signal representative of the instantaneous per phase line voltage with the reference signal error voltage to derive a line voltage error voltage, and using said line voltage error voltage for each phase to control said cycloconverter.

12. The method according to claim 11 further including multiplying said tank voltage error signal by an external control signal representative of desired reactive power and input power factor to derive a power factor control signal, and using said power factor control signal as the reactive power control signal.

13. The method of controlling a high frequency link cycloconverter system including cascaded input and output polyphase cycloconverters linked by a high frequency resonant tank and having in each phase an input series filter inductor connectable to a source of low frequency line voltage and conducting input line current, said method comprising the steps of continuously sensing the instantaneous tank voltage and deriving a sensor signal indicative thereof, comparing said tank voltage sensor signal to a reference voltage and deriving a tank voltage error signal, multiplying said tank voltage error signal by an external control signal representative of desired reactive power and input power factor to derive a power factor control signal, generating per phase cycloconverter reference signals that are phase and amplitude shifted with respect to the per phase line voltage for controlling the real power and in-phase component of input current in dependence upon the polarity and magnitude of said tank voltage error signal and for independently controlling the reactive power and quadrature component of input current in dependence upon the polarity and magnitude of said power factor control signal, and controlling said cycloconverter in dependence upon said cycloconverter reference signals to produce per phase input currents having desired in-phase and quadrature components while maintaining the tank voltage within predetermined limits.

14. The method according to claim 13 wherein the controlling step further includes sensing the instantaneous per phase input line current and summing a signal representative thereof with the respective per phase cycloconverter reference signal to derive a reference signal error voltage, summing a signal representative of the instantaneous per phase line voltage with the reference signal error voltage to derive a line voltage error voltage, and using said line voltage error voltage for each phase to control said cycloconverter.

* * * * *